United States Patent
Jones

[11] 3,724,922
[45] Apr. 3, 1973

[54] SCOPE FOR VIEWING THE INTERNAL SURFACE OF A BORE OF SIMILAR CAVITY

[76] Inventor: Ira David Jones, 1023 S. Main Street, South Bend, Ind. 46601

[22] Filed: Dec. 17, 1970

[21] Appl. No.: 99,153

[52] U.S. Cl..................350/96 R, 128/6, 128/397, 356/241
[51] Int. Cl.................................G02b 5/14
[58] Field of Search.........350/96 R, 286, 239; 128/6, 128/397; 356/241; 73/293; 116/118

[56] References Cited

UNITED STATES PATENTS

| | | | |
|---|---|---|---|
| 3,410,635 | 11/1968 | Lockwood | 350/239 |
| 3,413,067 | 11/1968 | Froio | 350/96 R |
| 3,357,433 | 12/1967 | Fourestier et al. | 350/96 R |
| 2,699,770 | 1/1955 | Fourestier et al. | 350/96 R |

Primary Examiner—David Schonberg
Assistant Examiner—Robert L. Sherman
Attorney—Oltsch & Knoblock

[57] ABSTRACT

A scope for viewing the internal surfaces of bores or similar cavities which includes a rod of optically clear material having a viewing end and an image transmitting end. The transmitting end of the rod includes two optical surfaces which have an included angle of 45° therebetween and which serve to direct image producing light transmitted internally through the rod onto the internal surface to be viewed and to thereafter transmit the image of the internal surface to the viewing end of the rod. The rod includes an annular light gathering surface which is positioned between the viewing and transmitting ends of the rod and which serves to transmit light from an external source internally through the rod to the transmitting end thereof for the purpose of illuminating the internal surface.

8 Claims, 7 Drawing Figures

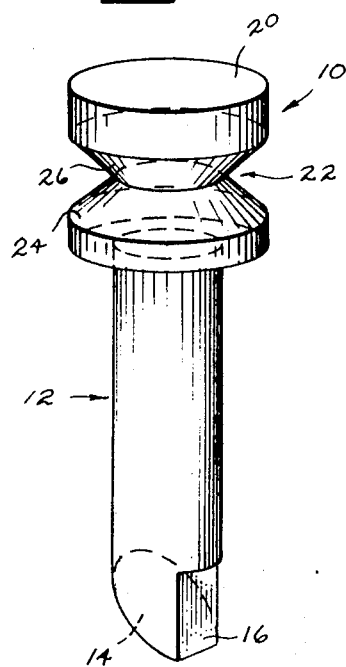
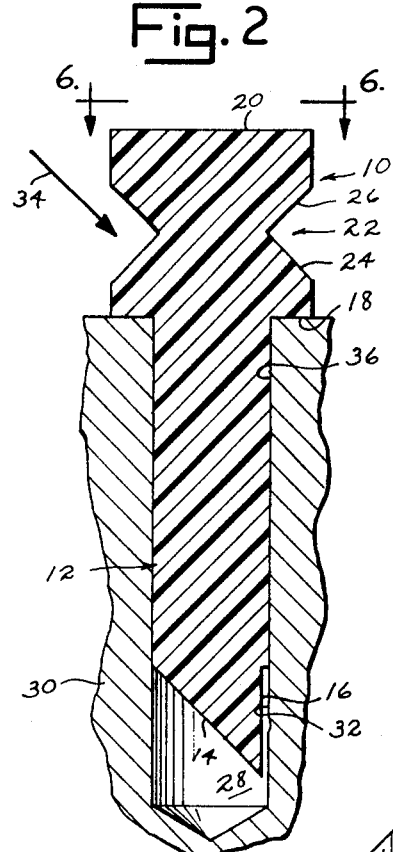
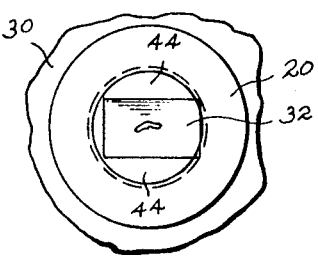
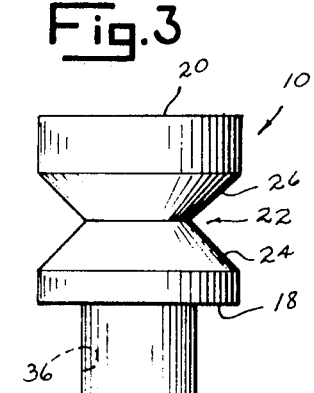
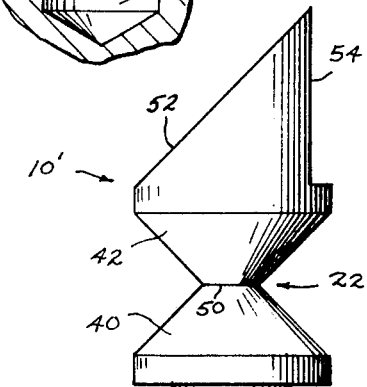
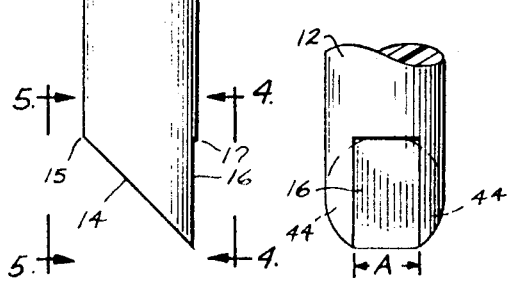
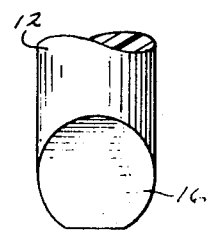
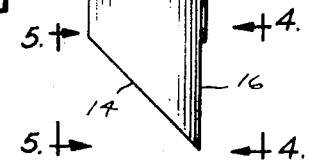
INVENTOR.
I. DAVID JONES
BY Oltsch & Knoblock
ATTORNEYS

SCOPE FOR VIEWING THE INTERNAL SURFACE OF A BORE OF SIMILAR CAVITY

SUMMARY OF THE INVENTION

This invention relates to a scope, sometimes known as a borescope, for viewing the internal surface of a bore or similar cavity.

In this invention, a rod of optically clear material is provided and formed with a viewing end and an image transmitting end. The image transmitting end includes first and second flat optical surfaces which are disposed at a 45° angle to each other and which serve to direct image producing light as it passes through the rod onto the internal cavity surface where the surface is illuminated and the image thereof is transmitted to the viewing end of the rod. The rod includes an annular light gathering surface which is positioned between the viewing end and transmitting end of the rod and which serves to gather external light and to direct the light to the transmitting end of the rod in order to illuminate the internal cavity surface.

Accordingly, it is an object of this invention to provide a scope of economical and simplified construction which can be utilized to view the internal surface of a bore or similar cavity.

It is another object of this invention to provide a borescope having an enlarged viewing head and a coaxial shank which is insertable into the bore of an object and positioned therein with the viewing head abutting the object.

It is another object of this invention to provide a scope for viewing the internal surface of a bore or similar cavity in an object which includes a shank insertable into the object cavity and an enlarged light gathering head which serves as a viewing surface and which abuts the object at the outer margin of the cavity so as to position the shank therein.

It is another object of this invention to provide a borescope of simplified design which eliminates refractive distortion of the viewed surface.

Still another object of this invention is to provide a borescope having a viewing end, image transmitting end, and including means intermediate said viewing and image transmitting ends which screens out fringe or secondary images formed about the periphery of the surface image received from the transmitting end of the scope.

Other objects of this invention will become apparent upon a reading of the invention's description.

BRIEF DESCRIPTION OF THE DRAWINGS

FIG. 1 is a perspective view of one embodiment of the scope of this invention.

FIG. 2 is a longitudinal sectional view of the scope of FIG. 1 shown inserted within a cavity.

FIG. 3 is a side elevation of the scope of FIG. 1.

FIG. 4 is a fragmentary elevational view of the scope as viewed from line 4—4 of FIGS. 3 and 7.

FIG. 5 is a fragmentary elevational view of the scope as viewed from line 5—5 of FIGS. 3 and 7.

FIG. 6 is a top plan view as seen from line 6—6 of FIG. 2.

FIG. 7 is a fragmentary side elevation of a modification of the scope shown in FIG. 1.

DESCRIPTION OF THE PREFERRED EMBODIMENTS

The preferred embodiments illustrated are not intended to be exhaustive or to limit the invention to the precise forms disclosed. They are chosen and described in order to explain the principles of the invention and its application and practical use to thereby enable others skilled in the art to best utilize the invention.

The scope illustrated in FIGS. 1-6 is rod shaped and includes a head 10 and an integral coaxial shank 12. Shank 12 is preferably cylindrical and of rigid construction, although it is to be understood that the shank may have a cross sectional configuration which is other than circular, such as square or rectangular, and may be formed of flexible material. Head 10 and shank 12 are formed of an optically clear material, such as acrylic resin which is sold under the names "Lucite" and "Plexiglas." Shank 12 includes an optical surface 14 which extends transversely of the shank at an angle of 45° to the axis thereof. Another optical surface 16, comprising a flat, is formed in the external cylindrical surface of shank 12 and is oppositely positioned from optical surface 14. The included angle between optical surfaces 14 and 16 is 45°. Both surfaces 14 and 16 are flat.

Head 10 of the rod is preferably cylindrical in shape and includes an annular shoulder 18 which serves to separate the head from shank 12. Head 10 includes an optical surface 20 which extends transversely of the head at a right angle to the axis of shank 12 and which is preferably flat. In some applications of this invention surface 20 may be convex or of some other desired optical configuration, such as a configuration which would magnify the transmitted surface image. An annular groove 22 is formed in head 10 between optical surface 20 thereof and shank 12. Groove 22 may be arcuate or, as illustrated in FIGS. 1-3, V-shaped in cross section and is defined by two adjoining generally frusto-conical surfaces 24 and 26. Surface 24 of groove 22 is optically clear and is preferably tapered at an angle of 45° to the axis of shank 12. Surface 26 of groove 22 is coated, roughened or finished so as to be rendered opaque or at least translucent. The surfaces 14, 16 and 20, like surface 24, are optically clear. Inner edges 15 and 17 of surfaces 14 and 16 are preferably located the same distance from shoulder 18.

To operate the scope above described, shank 16 thereof is inserted into a cavity 28 in work piece 30, as shown in FIG. 2. The maximum penetration of shank 12 into cavity 28 will be limited by the length of the shank as measured from shoulder 18 of head 10. External light rays, whether naturally or artificially produced, within the presence of work piece 30 pass through surface 24, strike the internal surface 36 of shank 12, and are reflected internally along the shank toward optical surface 14 at the end thereof. The rays when striking surface 14 are reflected laterally through optical surface 16 onto internal surface 32 of the work piece, thus causing its illumination. The image of internal surface 32 of the work piece passes through optical surface 16 where it is reflected longitudinally along shank 12 by optical surface 14 to optical surface 20 at the viewing end of the scope. If the diffused light, such as sunlight and general lamp light, within the work piece area is not sufficient to cause desired illumination of internal surface 32, additional light in the form of a pen-light or a collimated light source having its light rays 34 directed normally through surface 24 of groove 22 in head 10 may be utilized to provide the desired illumination of surface 32.

The angle of taper of surface 24 relative to the axis of shank 12 is such that the angle of incidence between rays 34 and surface 36 of the shank will exceed the critical angle of the material from which the shank is constructed. For an acrylic resinous material such a critical angle will be 42°.

Surfaces 14 and 16 are flat so that the image transmitted through surface 16 and reflected along shank 12 by surface 14 will experience very little or no refraction. When utilizing non-collimated exterior light sources to illuminate internal surface 32 of the work piece, many of the rays therefrom upon striking head surface 24 will be reflected toward viewing surface 20 where opaque surface 26 of the head prevents such rays from passing through surface 20 and interfering with the view of the scope user. Additionally, optical surface 16 of shank 12 is set in from the outer cylindrical surface of the shank and thus is protected from becoming scratched while being inserted into and rotated within a cavity. Also, by varying the spacing between the plane of surface 16 and the axis of shank 12 for specific constructions of the scope, the configuration of the boundaries of the transmitted surface image is varied to accommodate specific applications of the scope.

The embodiment of the scope illustrated in FIG. 7 is like the scope above described except that head 10' is of modified form. Annular groove 22 of head 10' is defined by frustoconical surfaces 40 and 42. Surfaces 40 and 42 are preferably tapered 45° relative to the axis of shank 12 with surface 40 being optically clear and surface 42 being opaque or at least translucent. The diameter of head 10' at the junction of surfaces 40 and 42, designated by the reference numeral 50, is less than the diameter of shank 12 and is preferably equal in diametrical dimension to the minimum side dimension "A" of optical surface 16 of the shank. In this construction of the scope only that portion of internal surface 32 as defined by a circle having a diameter equal to dimension "A" of optical surface 16 will be able to be viewed by the user of the scope. Thus the user of the scope shown in FIG. 7 would view only internal surface 32 and not the fringe or marginal portions 44 of optical surface 14 as seen in FIG. 6 when the reduced diameter of head 10 exceeds dimension "A" of surface 16.

The above described modified scope may have a viewing surface like surface 20 in FIGS. 1-3 or, as illustrated in FIG. 7, have angularly disposed optical surfaces 52 and 54 which are located outwardly of groove 22 at the viewing end of the scope. Surface 52 extends at an angle of 45° relative to the axis of shank 12 with surface 54 being positioned oppositely from surface 52 and paralleling the axis of the shank so that the image of the internal surface as reflected along shank 10 by surface 14 will contact surface 52 and be reflected laterally through surface 54 into the eye of the viewer.

In some applications of this invention it may be preferable to terminate the head of the scope at its reduced diameter, such as at diameter 50 of the embodiment shown in FIG. 7, and thereby use the transverse surface defined by diameter 50 as the optical viewing surface. Also, referring to the embodiment illustrated in FIGS. 1-6, it may be desirable to substitute a cylindrical part which extends to viewing surface 20 and which has a diameter which coincides with the diameter of head 10 at its reduced diameter for that portion of head 10 extending between surface 24 and surface 20.

It is to be understood that this invention is not to be limited to the details herein given but that it may be modified within the scope of the appended claims.

What I claim is:

1. A scope for viewing the internal surface of a bore or similar cavity comprising a rod having a viewing end and an image transmitting end, said image transmitting end including a first flat optical surface extending obliquely to the axis of said rod and a second flat optical surface paralleling the axis of said rod and located oppositely adjacent said first optical surface, the plane of said first optical surface so intersecting the plane of said second optical surface wherein image producing light when transmitted from an external source down said rod is reflected by said first optical surface through said second optical surface onto said internal surface with the image of said internal surface produced thereby being reflected by said first optical surface into the viewing end of said rod, said rod including an enlarged head and a coaxial shank both formed of continuous optically clear material, said shank including said first and second optical surfaces, said head including an optical viewing surface through which the reflected image of said internal surface is seen and a frusto-conical light gathering part positioned between said viewing surface and said shank for transmitting said image producing light from said external source down said shank, said light gathering part being coaxial with said shank and including an optical light transmitting surface means tapered toward said viewing surface for collecting overhead ambient light and directing said light down said shank.

2. The scope of claim 1 wherein said light gathering part has a maximum diameter exceeding the maximum transverse dimension of said shank.

3. The scope of claim 2 wherein said shank is cylindrical with said second optical surface forming a flat in the outer surface of said shank and having a width which is less than the diameter of said shank, said light gathering part having a minimum diameter which is less than the diameter of said shank so that a portion of the image of said internal surface as reflected by said first optical surface is blocked off from the view of the scope user.

4. The scope of claim 3 wherein the minimum diameter of said light gathering part is no greater than the minimum side dimension of said flat.

5. A scope for viewing the internal surface of a bore or similar cavity comprising a rod of optically clear material having a viewing end and an image transmitting end, said image transmitting end including a first flat optical surface extending obliquely to the axis of said rod and a second flat optical surface paralleling the axis of said rod and located oppositely adjacent said first optical surface, the plane of said first optical surface so intersecting the plane of said optical surface wherein image producing light when transmitted from an external source down said rod is reflected by said first optical surface through said second optical surface onto said internal surface with the image of said internal surface produced thereby being reflected by said first optical surface into the viewing end of said rod, said rod including an enlarged head and coaxial shank, said head including an optical viewing surface having an annular groove formed therein between said viewing surface and shank, said groove defined by an annular optical surface means coaxial with said shank, said annular optical surface means being frusto-conical and converging toward said optical viewing surface for collecting overhead ambient light and directing said light down said shank and onto said first optical surface.

6. The scope of claim 5 wherein said annular optical surface means has a major diameter exceeding the maximum transverse dimension of said shank and defining an annular shoulder which separates said head from said shank.

7. The scope of claim 5 wherein said groove is V-shaped and defined by said annular optical surface means which is clear and a frusto-conical annular opaque surface located between said optical viewing surface and said annular optical surface means.

8. The scope of claim 5 wherein said groove is V-shaped and defined by said annular optical surface means which is clear and a frusto-conical annular light diffusing surface located between said optical viewing surface and said annular optical surface means.

* * * * *